US010531170B2

(12) United States Patent
Kajihara et al.

(10) Patent No.: US 10,531,170 B2
(45) Date of Patent: Jan. 7, 2020

(54) LOUDSPEAKER DEVICE AND MOVABLE-BODY APPARATUS EQUIPPED WITH SAME

(71) Applicant: Panasonic Intellectual Property Management Co., Ltd., Osaka (JP)

(72) Inventors: Yoshimichi Kajihara, Osaka (JP); Takuji Miyamoto, Osaka (JP); Yuuki Izumi, Kanagawa (JP); Satoshi Koura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/310,500

(22) PCT Filed: Aug. 23, 2017

(86) PCT No.: PCT/JP2017/030027
§ 371 (c)(1),
(2) Date: Dec. 17, 2018

(87) PCT Pub. No.: WO2018/043224
PCT Pub. Date: Mar. 8, 2018

(65) Prior Publication Data
US 2019/0200110 A1    Jun. 27, 2019

(30) Foreign Application Priority Data

Sep. 1, 2016 (JP) ................... 2016-170436
Sep. 1, 2016 (JP) ................... 2016-170437

(51) Int. Cl.
*H04R 1/02* (2006.01)
*H04R 9/06* (2006.01)
(Continued)

(52) U.S. Cl.
CPC ............. *H04R 1/025* (2013.01); *H04R 1/023* (2013.01); *H04R 7/16* (2013.01); *H04R 9/025* (2013.01); *H04R 9/06* (2013.01)

(58) Field of Classification Search
CPC .......... H04R 1/025; H04R 1/023; H04R 7/16; H04R 9/025; H04R 9/06
See application file for complete search history.

(56) References Cited

U.S. PATENT DOCUMENTS 5,473,121 A     12/1995   Uryu
6,598,700 B1 *   7/2003   Schroeder ............... H04R 1/02
                                                    181/151
(Continued)

FOREIGN PATENT DOCUMENTS

CN     104541323 A      4/2015
CN     205005100 U      1/2016
(Continued)

OTHER PUBLICATIONS

International Search Report of PCT application No. PCT/JP2017/030027 dated Nov. 7, 2017.
(Continued)

*Primary Examiner* — Regina N Holder
(74) *Attorney, Agent, or Firm* — Greenblum & Bernstein, P.L.C.

(57) ABSTRACT

A loudspeaker device includes a loudspeaker, a box, and a lid. The box is provided with an opening and accommodates the loudspeaker. The lid covers the opening of the box. The lid includes a grille with one or more hexagonal holes each having an opening area equal to the area of a circle with a diameter in a range from 6.0 mm to 9.0 mm, inclusive.

10 Claims, 8 Drawing Sheets

(51) Int. Cl.
*H04R 9/02* (2006.01)
*H04R 7/16* (2006.01)

(56) References Cited

U.S. PATENT DOCUMENTS

| | | | | | |
|---|---|---|---|---|---|
| 2005/0077102 | A1* | 4/2005 | Banter | .................... | H04R 1/023 |
| | | | | | 181/149 |
| 2008/0260186 | A1* | 10/2008 | Nakamura | ............. | H04R 1/345 |
| | | | | | 381/152 |
| 2013/0136280 | A1* | 5/2013 | Stephanou | ............. | H04R 17/00 |
| | | | | | 381/190 |
| 2014/0056438 | A1* | 2/2014 | Baalu | .................... | B60Q 5/008 |
| | | | | | 381/86 |

FOREIGN PATENT DOCUMENTS

| | | | |
|---|---|---|---|
| JP | 4-340896 | A | 11/1992 |
| JP | 5-328487 | A | 12/1993 |
| JP | 6-038292 | A | 2/1994 |
| JP | 09051594 | * | 2/1997 |
| JP | 2003284186 | * | 10/2003 |
| JP | 3517736 | B | 4/2004 |
| JP | 3752686 | B2 | 3/2006 |
| JP | 2006333227 | * | 12/2006 |
| JP | 2007-221250 | A | 8/2007 |
| JP | D1395649 | | 8/2010 |
| JP | 2011-056456 | A | 3/2011 |
| JP | D1431552 | | 1/2012 |
| JP | 2014-220670 | | 11/2014 |
| JP | 2015-019251 | | 1/2015 |
| WO | 2014/031621 | A2 | 2/2014 |

OTHER PUBLICATIONS

English Translation of Chinese Search Report dated Aug. 15, 2019 for the related Chinese Patent Application No. 201780048076.3.
English Translation of the First Office Action dated Aug. 15, 2019 for the related Chinese Patent Application No. 201780048076.3.
Submission of Information dated Aug. 2, 2019 for the related Japanese Patent Application No. 2016-170436.
Submission of Information dated Aug. 19, 2019 for the related Japanese Patent Application No. 2016-170437.

* cited by examiner

LOUDSPEAKER DEVICE AND MOVABLE-BODY APPARATUS EQUIPPED WITH SAME

CROSS-REFERENCE TO RELATED APPLICATIONS

This application is a U.S. national stage application of the PCT International Application No. PCT/JP2017/030027 filed on Aug. 23, 2017, which claims the benefit of foreign priority of Japanese patent application No. 2016-170436 and No. 2016-170437 both filed on Sep. 1, 2016, the contents all of which are incorporated herein by reference.

TECHNICAL FIELD

The present disclosure relates to a loudspeaker device including a loudspeaker and also to a movable-body apparatus equipped with the device.

BACKGROUND ART

Electric vehicles, for example, are equipped with a vehicle proximity warning device, which alerts pedestrians to their approach. A typical vehicle proximity warning device is installed in high-temperature, severe environments such as in the engine compartment exposed to oil or rain splash during driving. The engine compartment is mounted with a motor as the power source of the electric vehicle. The vehicle proximity warning device includes a loudspeaker, a loudspeaker box in which the loudspeaker is accommodated, and an electronic circuit for driving the loudspeaker.

Figure 12:
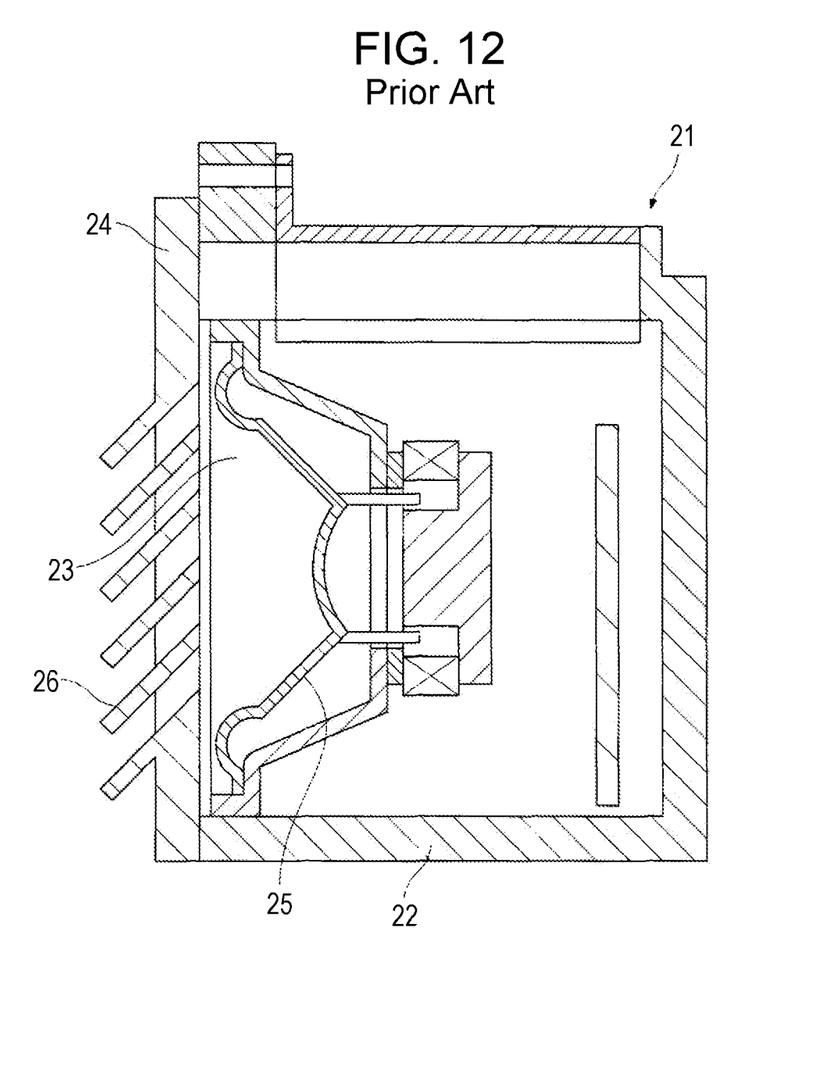
FIG. 12 is a sectional view of a conventional loudspeaker device.

As shown in FIG. 12, according to Patent Literature 1, loudspeaker box 21 includes box 22 with opening 23, and lid 24 for covering opening 23. Loudspeaker box 21 accommodates loudspeaker 25.

Loudspeaker box 21 is installed in a position exposed to rain splash from the road surface while the electric vehicle is driving. Therefore, lid 24 is desired to protect loudspeaker 25 and to allow the alarm from loudspeaker 25 to be clearly emitted. To meet these purposes, lid 24 includes louver 26, which covers opening 23.

Patent Literature 2 discloses an attachment to a loudspeaker. This attachment is installed not in adverse environments exposed to rain water like vehicle proximity warning devices but in a car instrument panel. The attachment includes reinforcing ribs on the back of the loudspeaker grille in order to reinforce the rigidity of the grille having many small holes as sound holes. To be more specific, the disclosed reinforcing ribs are zigzagged or hexagonal. These ribs prevent the grille from being dented when accidentally pressed. However, the spacing between the ribs or the size of the hexagonal holes are too large as the sound holes of the loudspeaker grille. Thus, the ribs alone cannot protect the loudspeaker.

Furthermore, as described above, the vehicle proximity warning devices are installed in severe environments, so that widely used diaphragms are made from resin or resin fiber.

Meanwhile, Patent Literature 3 discloses a loudspeaker diaphragm with a two- or three-layer cross-sectional structure, which improves the sound quality of the loudspeaker. In patent Literature 3, the paper liquids used in the first and second paper-making processes contain pulp, and the paper liquid used in the third process contains Manila hemp.

CITATION LIST

Patent Literature

PTL 1: Japanese Unexamined Patent Application Publication No. 2014-220670
Patent Literature 2: Japanese Unexamined Patent Application Publication No. 2015-019251
Patent Literature 3: Japanese Patent No. 3517736

SUMMARY OF THE INVENTION

In Patent Literature 1, louver 26 causes the sound to be emitted directionally, which is not wanted. If louver 26 is replaced by the loudspeaker grille of Patent Literature 2, excellent sound emission performance can be achieved. However, rain water entering through the loudspeaker grille cannot be drained through the small sound holes, indicating poor drainage performance.

Figure 8:
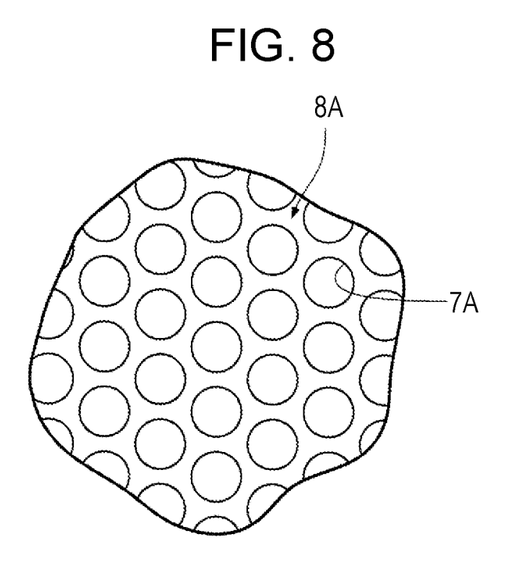
FIG. 8 is a front view of a grille in Comparative Example 1.

In cases that louver 26 of Patent Literature 1 causes poor sound emission performance, louver 26 can be replaced by lid 24 with many round holes (water-drain holes 7A) on its front surface as shown in FIG. 8. The round holes have a larger diameter (about 8.0 mm) than the sound holes of Patent Literature 2. However, a mere change in the hole size cannot significantly improve the drainage performance.

An object of the present disclosure is to provide a loudspeaker device that is excellent in both sound emission performance and drainage performance.

The loudspeaker device of the present disclosure includes a loudspeaker, a box, and a lid. The box is provided with an opening and accommodates the loudspeaker. The lid covers the opening of the box. The lid includes a grille with hexagonal holes having an opening area equal to the area of a circle with a diameter in a range from 6.0 mm to 9.0 mm, inclusive.

The opening of the box is covered with the lid having the above-described grille, so that the loudspeaker device is excellent both in sound emission performance and in drainage performance.

DESCRIPTION OF EMBODIMENTS

Figure 1:
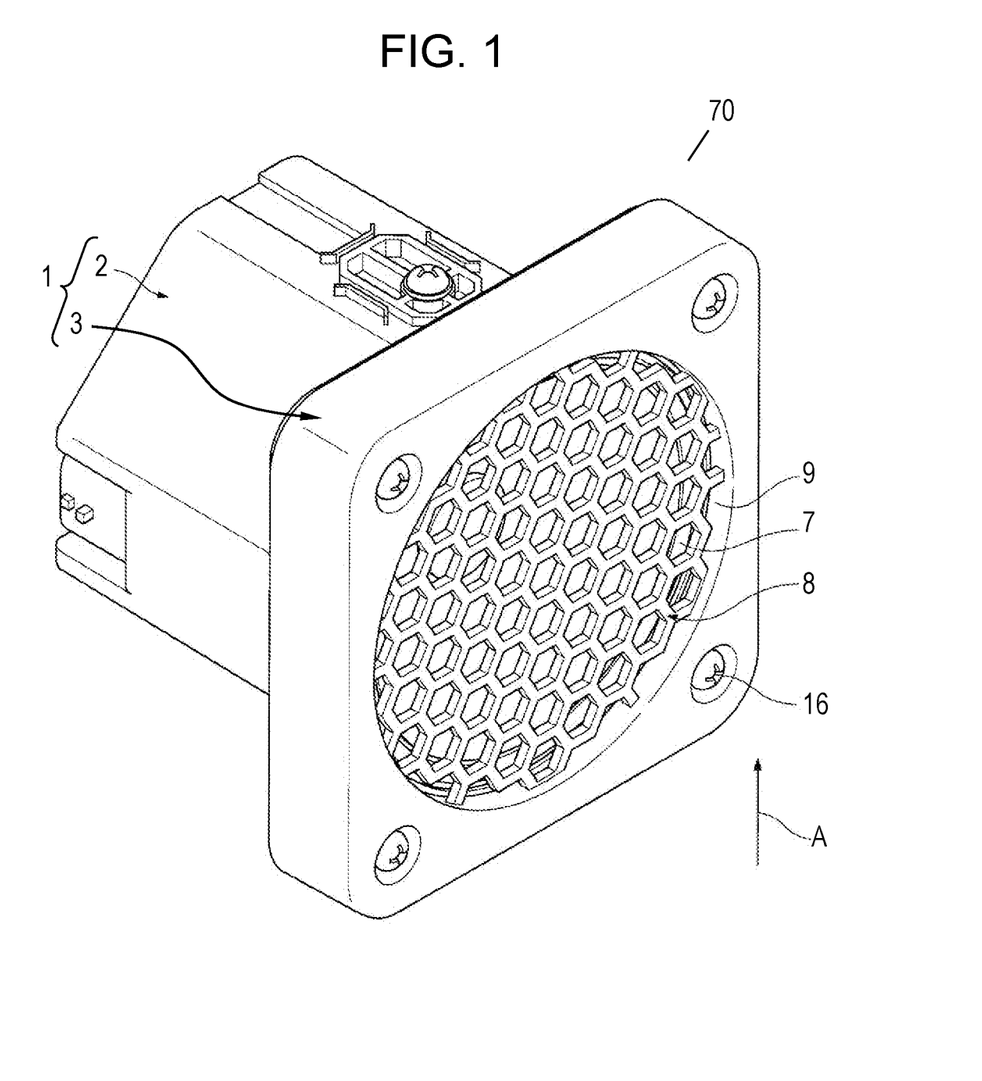
FIG. 1 is an external perspective view of a loudspeaker device according to an exemplary embodiment of the present disclosure.
Figure 2:
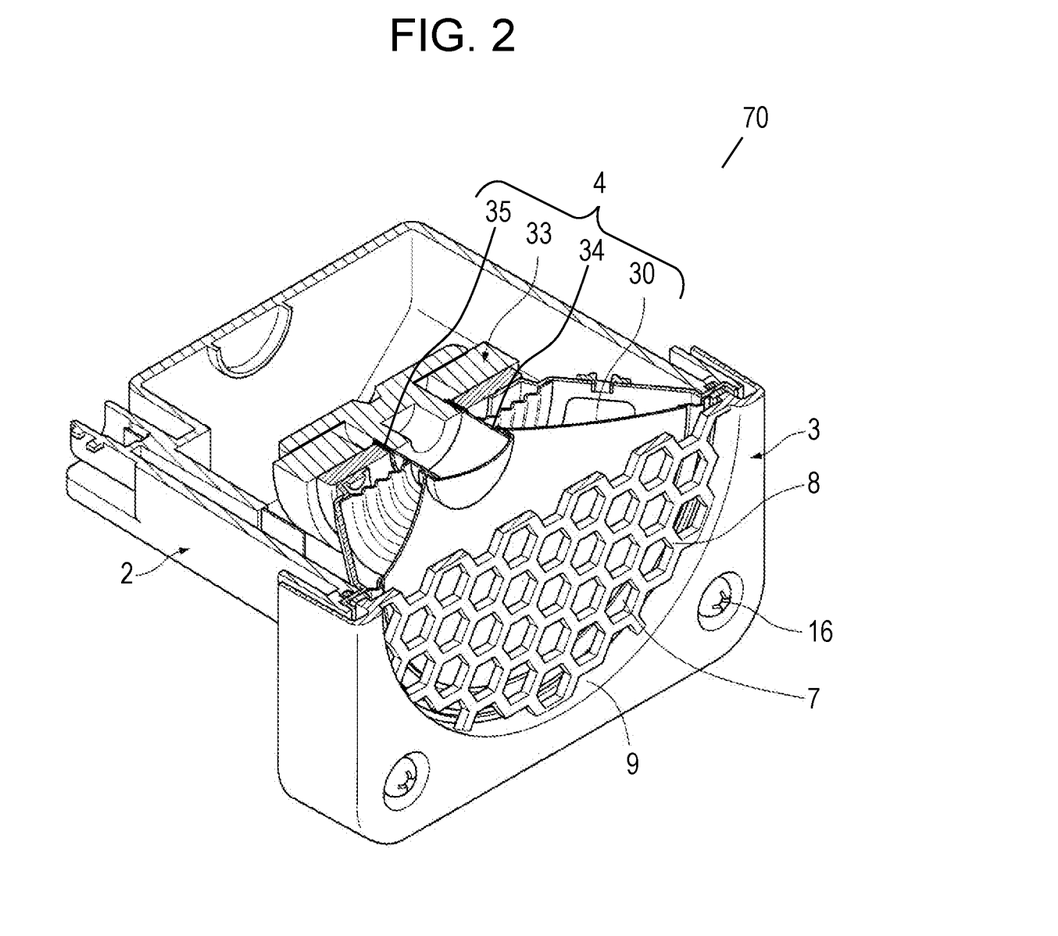
FIG. 2 is a sectional view of the loudspeaker device shown in FIG. 1.
Figure 3:
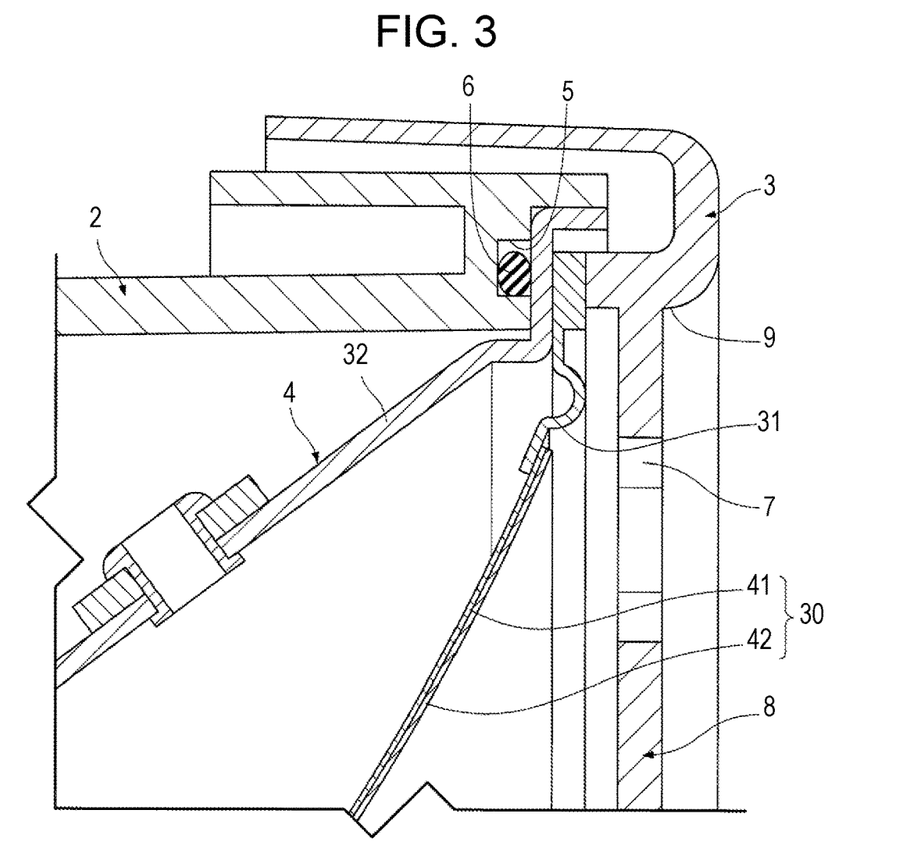
FIG. 3 is an enlarged sectional view of a part of the loudspeaker device shown in FIG. 1.

FIG. 1 is an external perspective view of loudspeaker device 70 according to an exemplary embodiment of the present disclosure. FIG. 2 is a sectional view of loudspeaker device 70. FIG. 3 is an enlarged sectional view of a part of loudspeaker device 70.

As shown in FIGS. 1 and 2, loudspeaker device 70 includes loudspeaker 4 and loudspeaker box 1. Loudspeaker box 1 includes box 2 and lid 3. Box 2 is provided with an opening and accommodates loudspeaker 4. Lid 3 covers (or closes) the opening of box 2. Lid 3 includes grille 8. Grille 8 is provided with hexagonal water-drain holes 7 (hereinafter, holes 7). Holes 7 have a hole area (opening area), which is equal to a circle area with a diameter in a range from 6.0 mm to 9.0 mm, inclusive.

As shown in FIG. 3, box 2 is provided with annular recess 5 extending along the outer periphery of the back side of loudspeaker 4. Device 70 further includes O-ring 6 fitted in recess 5. O-ring 6 is elastically deformed when lid 3 is fixed to box 2 with screw 16 (see FIG. 1) so as to seal the inside of loudspeaker box 1. With this configuration, box 2 is protected from water infiltration therein.

Box 2 and lid 3 are molded from synthetic resin. In order to ensure their heat resistance, strength, and rigidity, synthetic resins with these features are selected. The resins may be mixed with a reinforced filler such as glass fiber when molded.

As described above, grille 8 with hexagonal holes 7 is integrally molded with front opening 9 of lid 3. Hexagonal holes 7 with a honeycomb structure can make grille 8 stronger than round water-drain holes. As a result, grille 8 can be produced with a smaller amount of synthetic resin than in the case of using round water-drain holes. This allows holes 7 to have a higher aperture ratio, thus contributes to weight-reduction of grille 8.

Next, the structure of loudspeaker 4 is described. As shown in FIGS. 2 and 3, loudspeaker 4 includes magnetic circuit 33, diaphragm 30, bobbin 34, voice coil 35, edge 31, and loudspeaker frame 32. Magnetic circuit 33 is provided with a magnetic gap. Bobbin 34 has a first end coupled with diaphragm 30 and a second end inserted in the magnetic gap. Voice coil 35 is wound around bobbin 34. The outer periphery of diaphragm 30 is supported by loudspeaker frame 32 via edge 31.

Figure 4:
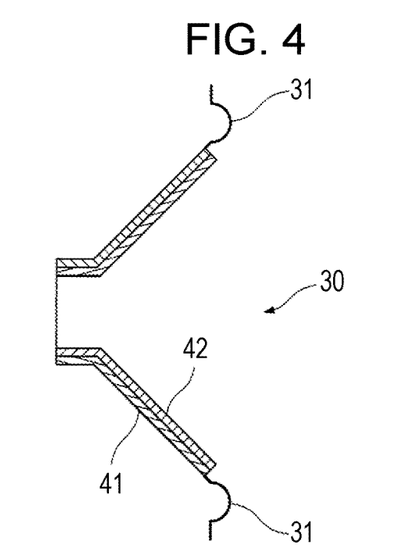
FIG. 4 is a sectional view of a diaphragm of a loudspeaker in the loudspeaker device shown in FIGS. 1 to 3.

FIG. 4 is a sectional view of diaphragm 30. Diaphragm 30 has rear layer 41 and front layer 42, or in other words, a two-layer structure. Rear layer 41 contains a beaten cellulose paper material and a water-proofing agent adsorbed on the cellulose paper material. To be more specific, the cellulose paper material has a freeness in a range from 500 ml to 700 ml of Canadian freeness, for example. The cellulose paper material contains fibers with an average diameter of about 13 µm, for example, and is composed of wood or bamboo cellulose. Thus, the cellulose paper material of rear layer 41 contains, as its main component, wood or bamboo with an average fiber diameter of not less than 12.5 µm and less than 13.5 µm. Furthermore, in addition to the water-proofing agent, a resin material may be adsorbed on the cellulose paper material. Meanwhile, front layer 42 is composed of a cellulose fiber composition with an average fiber diameter in a range from 10 nm to 100 nm.

Well-known paper diaphragms are prepared as follows. First, pulp is beaten and molded. Next, resin diluted with methyl ethyl ketone (MEK) is adsorbed on the surface of the molded pulp, and the organic solvent is evaporated. On the other hand, diaphragm 30 of the present exemplary embodiment is prepared as follows. First, the pulp is beaten together with a highly water-dispersible water-repellent emulsion (wax) or resin emulsion (wax) in a pulp beating process. Next, water is evaporated by the heat of press molding. The heat melts the wax and spreads it to the entangled portion of the pulp, so that the resin bonds between the fibers. The water repellency of the emulsions reinforces the hydrogen bonding between the cellulose fibers. In other words, the water evaporation causes hydrogen bonding between the water repellent material inside diaphragm 30 and the water-repellent material on the surface of diaphragm 30. Thus, a firm bond is established throughout diaphragm 30.

As described above, in rear layer 41, which is the base layer of diaphragm 30, the water-proofing agent is adsorbed on the cellulose fibers deep inside layer 41. Meanwhile, front layer 42 is composed of resin-like cellulose fiber composition. This structure enables diaphragm 30 to have high waterproof properties while using the cellulose paper material as the base material, and also enables loudspeaker 4 to be light in weight and to provide high sound pressure.

Next, the manufacturing process of diaphragm 30 will be described with reference to FIGS. 5A to 5F.

Figure 5A:
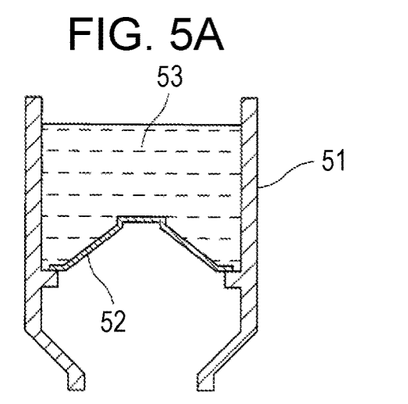
FIG. 5A shows a manufacturing step of the diaphragm shown in FIG. 4.

In the step shown in FIG. 5A, primary paper-making net 52 is fixed in paper-making bath 51, and then primary paper liquid 53 is put into bath 51. Primary paper liquid 53, which contains wood or bamboo pulp with a fiber diameter of about 13 µm, is prepared by beating and disentangling the entangled fibers of the pulp as follows. First, the pulp is put into a beater with at least one of a fluorine emulsion and a paraffin emulsion as a water-proofing agent. Next, the pulp is beaten while the water-proofing agent is being adsorbed on the pulp. In order to further improve waterproofness, a resin emulsion may be added in the beater. The ratio of the water-proofing agent to the paper material is in a range from 5 wt % to 10 wt %, inclusive. Other than these, a silicone- or silane-based water-proofing agent may be used.

Examples of the resin emulsion include epoxy-, acrylic- and ester-based ones, and synthetic resins such as vinyl acetate polymers, acrylic ester copolymers, and ethylene-vinyl acetate acrylic-acid copolymers.

Figure 5B:
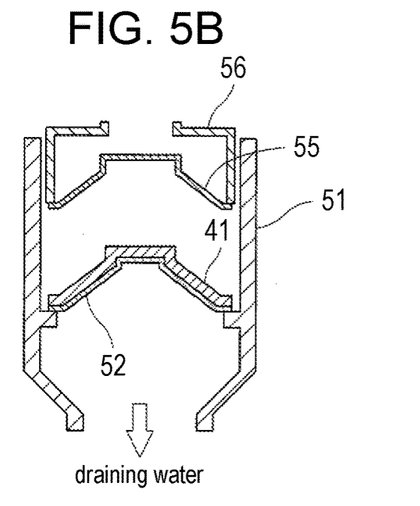
FIG. 5B shows a manufacturing step of the diaphragm subsequent to the step shown in FIG. 5A.

In the step shown in FIG. 5B, rear layer 41 made from primary paper liquid 53 is deposited on primary paper-making net 52 by draining water from the bottom of paper-making bath 51. Next, paper-making table 56 with which secondary paper-making net 55 is fixed is placed in bath 51. According to well-known methods, the one and only layer deposited on net 52 accounts for 100 wt % of the total weight of diaphragm 30. On the other hand, according to the present exemplary embodiment, rear layer 41, which is the base layer, accounts for 85 wt % to 99 wt %, inclusive, of the total weight of diaphragm 30 as a finished product.

Figure 5C:
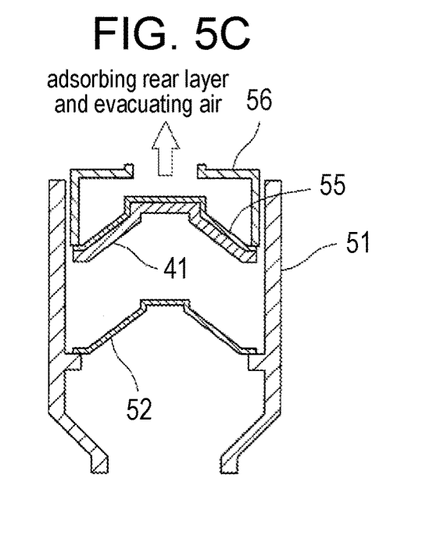
FIG. 5C shows a manufacturing step of the diaphragm subsequent to the step shown in FIG. 5B.

In the step shown in FIG. 5C, paper-making table 56 is lowered and air is evacuated from the top of secondary paper-making net 55. This operation allows rear layer 41 deposited on primary paper-making net 52 to be sucked on the bottom surface of secondary paper-making net 55. Thereafter, paper-making table 56 is lifted to remove rear layer 41 from secondary paper-making net 52 and to raise rear layer 41. Rear layer 41 is kept sucked until the end of the step shown in FIG. 5E described below.

Figure 5D:
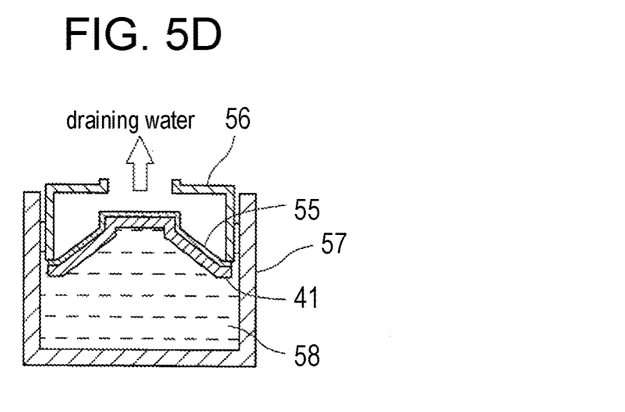
FIG. 5D shows a manufacturing step of the diaphragm subsequent to the step shown in FIG. 5C.

In the step shown in FIG. 5D, rear layer 41 and secondary paper-making net 55 both fixed to paper-making table 56 are lowered and soaked into secondary paper liquid 58 prepared in paper-making bath 57. Secondary paper liquid 58 is composed of only water and a cellulose fiber composition with an average fiber diameter of, e.g., 10 nm to 100 nm.

Next, the cellulose fiber composition is made deposited on the bottom surface of rear layer 41 for a predetermined period of time while water is being drained from the top of paper-making table 56. This secondary paper-making process is performed when rear layer 41 obtained by the primary paper-making process is half-dry and half-wet, which corresponds to a water content of 5 wt % to 30 wt %.

The cellulose fiber composition has a Young's modulus of about 5000 MPa or greater, for example. General paper pulps have Young's moduli of 700 to 2000 MPa, and the appropriate Young's modulus of the cellulose fiber composition is considered to be 2.5 times or greater than those. To be more exact, the Young's modulus increases in proportion to L/D (fiber length/fiber diameter). Assume that a typical pulp has a fiber length of 2 mm and a fiber diameter of $13 \times 10^{-6}$ m ($\mu = 10^{-6}$), and that the nanofibers have a fiber length of 0.3 mm and a fiber diameter of $100 \times 10^{-9}$ m (nano=$10^{-9}$). In this case, (the L/D of the typical pulp)/(the L/D of the nano fibers) is 6.7. As a result, 700 MPa× 6.7=4666 MPa. Therefore, the Young's modulus of the cellulose fiber composition is set to be not less than about 5000 MPa. Specific examples of the cellulose nanofiber composition include fibers obtained by water-dispersing and beating nata de coco, fibers derived from bamboo, and fibers derived from wood.

Figure 5E:
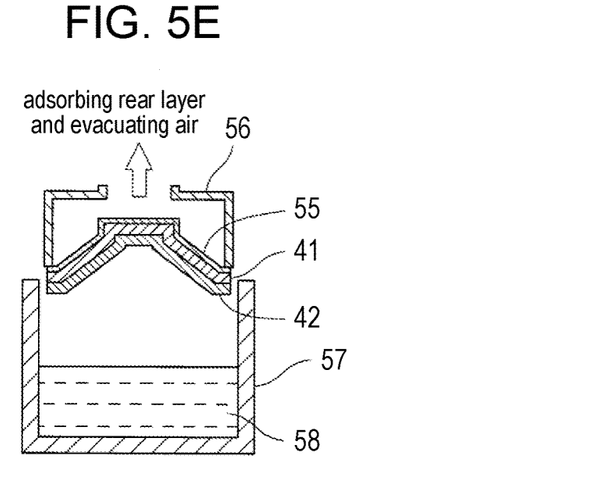
FIG. 5E shows a manufacturing step of the diaphragm subsequent to the step shown in FIG. 5D.

In the step shown in FIG. 5E, paper-making table 56 is lifted and air is evacuated from the top of secondary paper-making net 55. This operation allows the fibers of the cellulose fiber composition in secondary paper liquid 58 to be entangled into rear layer 41, thereby completing the deposition of front layer 42. The deposition time in the step shown in FIG. 5D is controlled such that front layer 42 is ¼ to ⅒ as thick as rear layer 41.

The thickness of front layer 42 is set to ¼ to ⅒ that of rear layer 41 for the reason below. The theoretical specific gravity of cellulose is about 1.2. In order to increase the sound pressure of loudspeaker 4, the apparent specific gravity of diaphragm 30 should be reduced to 0.5 by a paper-making process. In other words, front layer 42, if too thick, would reduce the sound pressure of loudspeaker 4. On the other hand, the present exemplary embodiment focuses on providing reliable loudspeaker 4 with front layer 42 resistant to severe conditions, which is the most desired feature of front layer 42. To achieve this, front layer 42 can only be ¼ to ⅒ as thick as rear layer 41.

Figure 5F:
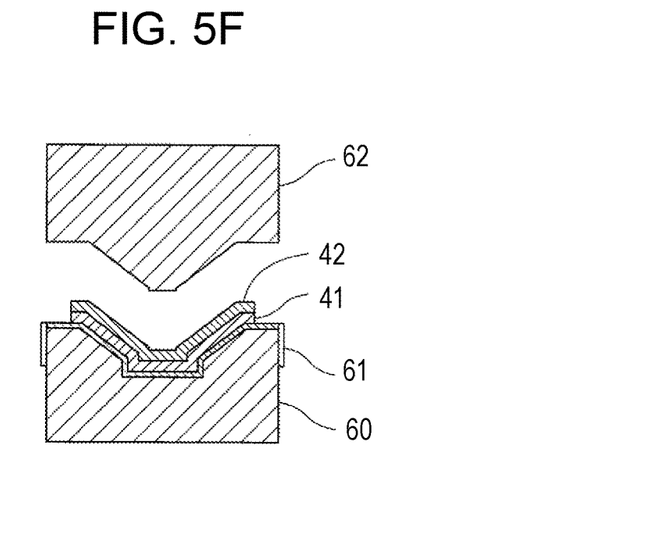
FIG. 5F shows a manufacturing step of the diaphragm subsequent to the step shown in FIG. 5E.

In the step shown in FIG. 5F, front layer 42 and rear layer 41, which are stacked and integrated with each other by multi-layer paper making, are transferred onto wire net 61 fixed to mold 60. Then, mold 62 is placed on the integrated member to achieve hot-press molding. Alternatively, non-press molding with hot air can be used.

In diaphragm 30 manufactured according to the above steps, rear layer 41 as the base layer is made from pulp. This pulp is coated with water-repellent resin, such as fluorine resin. Meanwhile, front layer 42 exposed on the front surface of loudspeaker 4 is made from a cellulose fiber composition with an average fiber diameter of 10 nm to 100 nm. This allows diaphragm 30 to be lighter in weight than well-known paper diaphragms impregnated with a waterproof solution. Diaphragm 30 is also more reliable than well-known pulp diaphragms, which are vulnerable in high-temperature environments such as in an engine compartment or in an environment exposed to chemicals. Furthermore, loudspeaker 4 has a high sound pressure even if its magnetic circuit is not large. The vehicle proximity warning device mounted with loudspeaker 4 including diaphragm 30 is excellent in sound pressure, waterproofness, and chemical resistance. Hence, the device is compliant with regulations established by the National Highway Traffic Safety Administration (NHTSA) of the United States Department of Transportation.

In the present exemplary embodiment, diaphragm 30 lighter in weight than well-known diaphragms allows the sound pressure of loudspeaker 4 to be higher than that of well-known loudspeakers by 1 to 1.5 dB.

As described above, loudspeaker 4 ensures the necessary sound pressure level even in adverse environments such as in a motor or engine compartment of vehicles, and also provides significant effects of waterproofness and oil resistance. Hence, loudspeaker 4 achieves high performance in the motor or engine compartment of vehicles or other similar locations, which has not been achieved by loudspeakers including a well-known loudspeaker diaphragm.

In the present exemplary embodiment, the fibers of front layer 42 are composed of a cellulose fiber composition alone. Alternatively, however, front layer 42 may contain lighter-weight, harder fibers such as carbon fiber or carbon nanotube. To be more specific, front layer 42 may contain at least one of carbon fiber, carbon nanotube, and chitin fiber contained in crab and shrimp shells.

Figure 6:
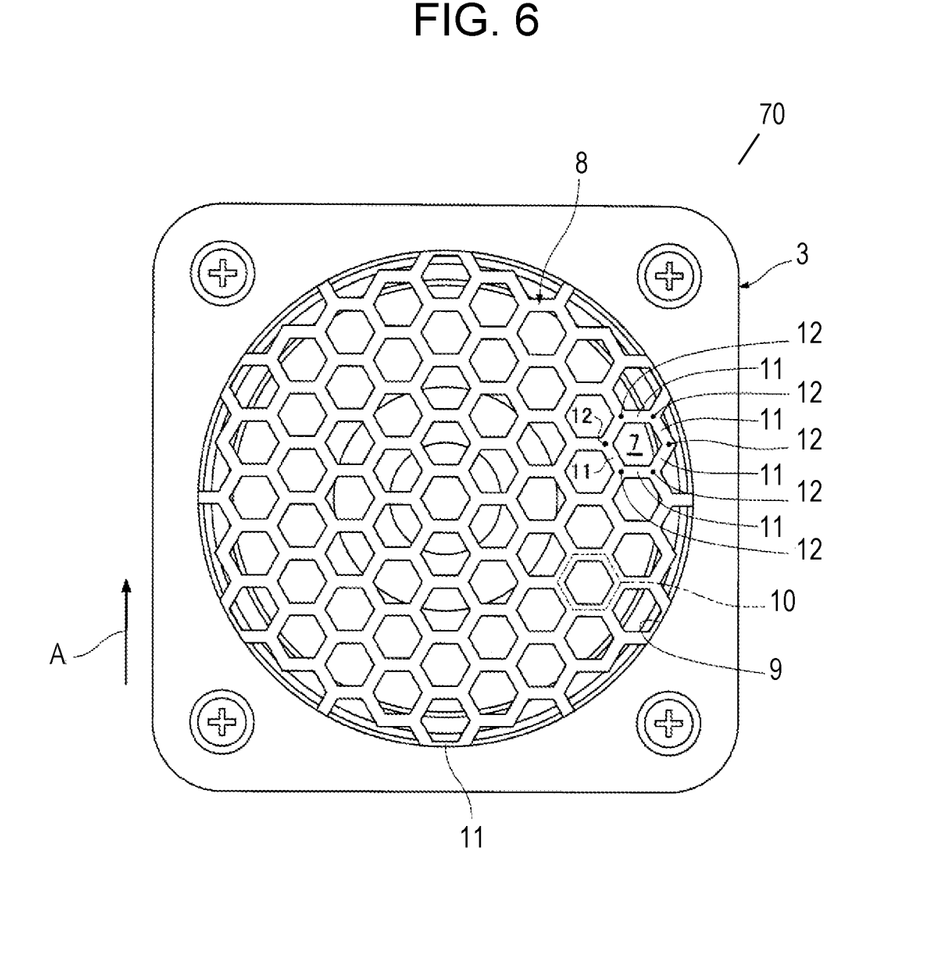
FIG. 6 is a front view of the loudspeaker device shown in FIG. 1.

FIG. 6 is a front view of loudspeaker device 70 in an installed orientation. The direction of arrow A indicates the upward direction in the installed orientation.

Grille 8 is provided with a plurality of holes 7 arranged at regular intervals. Each hole 7 is hexagonal and has the same hole area as a round hole with a diameter in a range from 6.0 mm to 9.0 mm, inclusive. As shown by the phantom line in FIG. 6, grille 8 is composed of consecutive annular frames 10 partitioning holes 7. Each annular frame 10 has sides 11 and corners 12 connecting sides 11. When front opening 9 is circular, some annular frames 10 are connected, at some of their sides 11, to the inner peripheral surface of front opening 9 at the bottom end of front opening 9. In FIG. 6, one side 11 of one annular frame 10 is connected to the inner peripheral surface of front opening 9 at the bottom end of front opening 9. However, it is only required that at least one annular frame 10 is connected, at one or two sides 11, to the inner peripheral surface of front opening 9.

Figure 7:
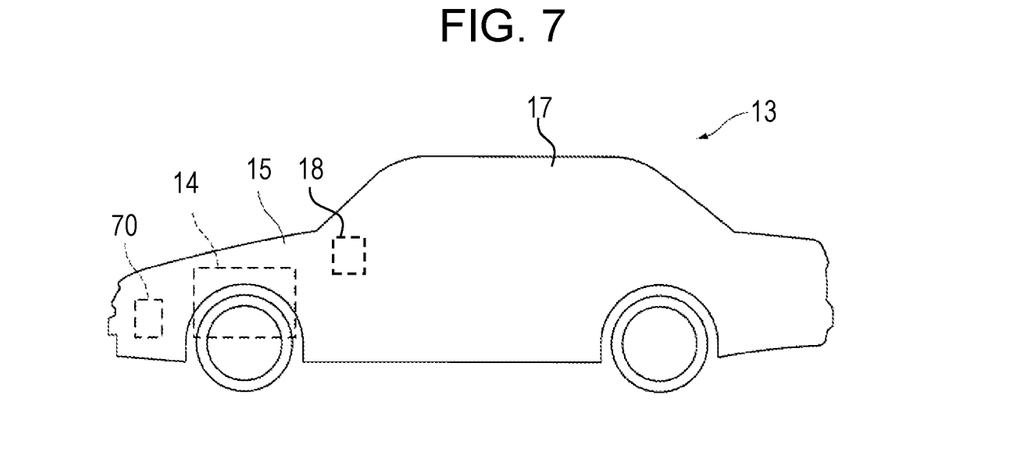
FIG. 7 is a schematic diagram of a movable-body apparatus mounted with the loudspeaker device shown in FIG. 1.

FIG. 7 shows a movable-body apparatus mounted with loudspeaker device 70 as a part of the vehicle proximity warning device. Movable-body apparatus 13 includes movable main body 17, motor compartment 15 in main body 17, motor 14 fixed in motor compartment 15, loudspeaker device 70 installed in motor compartment 15, and electronic device 18 mounted in the main body. Motor 14 is the power source of movable-body apparatus 13.

Electronic device 18, which is a signal processor for generating a signal to be supplied to loudspeaker 4, is disposed near the dashboard in FIG. 7. Alternatively, however, electronic device 18 may be accommodated in box 2.

Movable-body apparatus 13 is being described as an electric vehicle; alternatively, however, apparatus 13 may be an engine-driven vehicle or a hybrid vehicle equipped with an engine and a motor. Apparatus 13 can be even a motorcycle, an electric bicycle, a forklift, etc.

Next, grille 8 and holes 7 will be described in detail with reference to specific examples.

FIG. 8 shows grille 8A of Comparative Example 1. Grille 8A is identical to the grille shown in FIG. 6 except that round water-drain holes 7A (hereinafter, holes 7A) are provided instead of holes 7.

A verification experiment has been conducted using movable-body apparatus 13 mounted with loudspeaker device 70 shown in FIG. 6 and a movable-body apparatus mounted with a loudspeaker device including grille 8A shown in FIG. 8. Each hole 7 of Exemplary Example is hexagonal and has the same hole area as a round hole with a diameter of 8.0 mm. Meanwhile, each hole 7A of Comparative Example 1 has a diameter of 8.0 mm.

Figure 9:
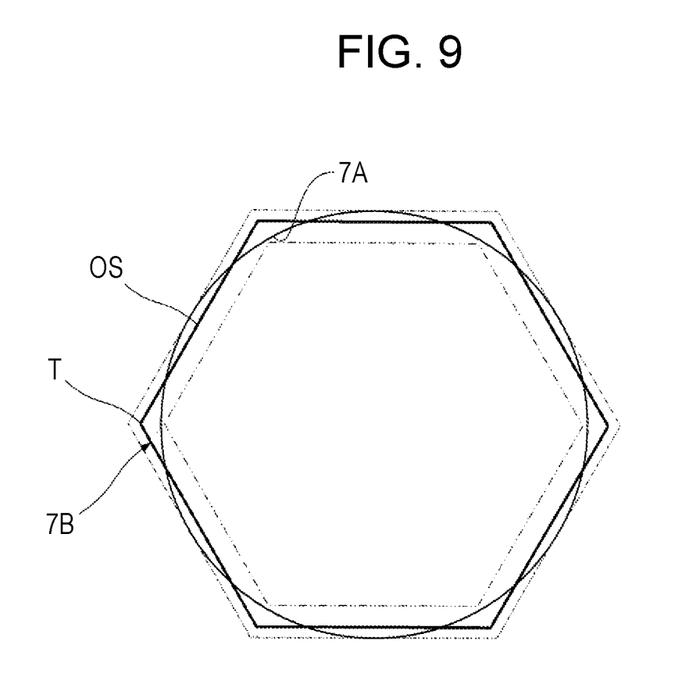
FIG. 9 is a comparison diagram between a round hole with a diameter of 8.0 mm and a water-drain hole with a hole area slightly larger than that of the round hole.
Figure 10:
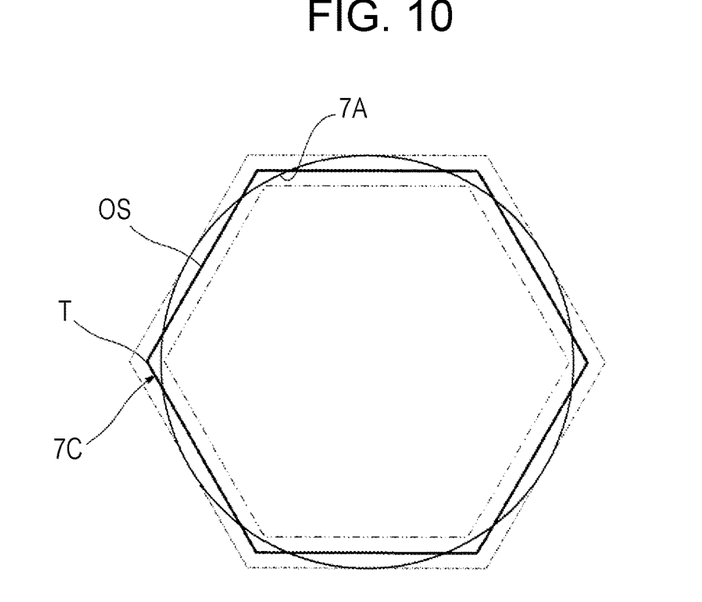
FIG. 10 is a comparison diagram between a round hole with a diameter of 8.0 mm and a water-drain hole with a hole area slightly smaller than that of the round hole.

The relationship between hole 7 and hole 7A will be described as follows. FIG. 9 is a comparison diagram between hole 7A with a diameter of 8.0 mm and hole 7B having a hole area slightly larger than that of holes 7A. FIG. 10 is a comparison diagram between hole 7A with a diameter of 8.0 mm and hole 7C having a hole area slightly smaller than that of holes 7A. Hole 7 can be hexagonal and has a hole area slightly larger than that of round hole 7A with a diameter of 8.0 mm as hole 7B shown in FIG. 9. Alternatively, hole 7 can be hexagonal and has a hole area slightly smaller than that of round hole 7A with a diameter of 8.0 mm as holes 7C shown in FIG. 10. Thus, vertices T of holes 7B and 7C are located outside hole 7A, and parts of sides OS of holes 7B and 7C are located inside hole 7A. In the experiment, holes 7 of Exemplary Example are hexagons whose sides are 4.40 mm each.

The results of the experiment indicate that both Exemplary Example and Comparative Example 1 have excellent sound emission properties. Meanwhile, concerning drainage performance, Exemplary Example has been confirmed to have excellent drainage performance even in a case where Comparative Example 1 has not drained rain water thoroughly. In the case of round holes 7A, the surface tension of rain water generated around round holes 7A is considered to cause the low drainage performance. In contrast, the surface tension of rain water generated around hexagonal holes 7 in Exemplary Example is considered to be smaller than that in the case of round holes 7A of Comparative Example 1. This seems to be the reason for higher drainage performance in Exemplary Example than in Comparative Example 1. Grille 8 with hexagon holes 7 (each side: 3.30 mm) each having the same hole area as a round hole with a diameter of 6.0 mm has been confirmed to have also excellent drainage performance.

On the other hand, a grille with drain holes each having the same hole area as a round hole with a diameter of less than 6.0 mm provides low drainage performance. It has been confirmed that a grille with hexagonal (each side: 4.95 mm) drain holes each having the same hole area as a round hole with a diameter of 9.0 mm provides the same performance as a grille with hexagonal drain holes each having the same hole area as a round hole with a diameter of 8.0 mm. However, grille 8 has low strength when having hexagonal drain holes each having the same hole area as a round hole with a diameter of larger than 9.0 mm.

Figure 11:
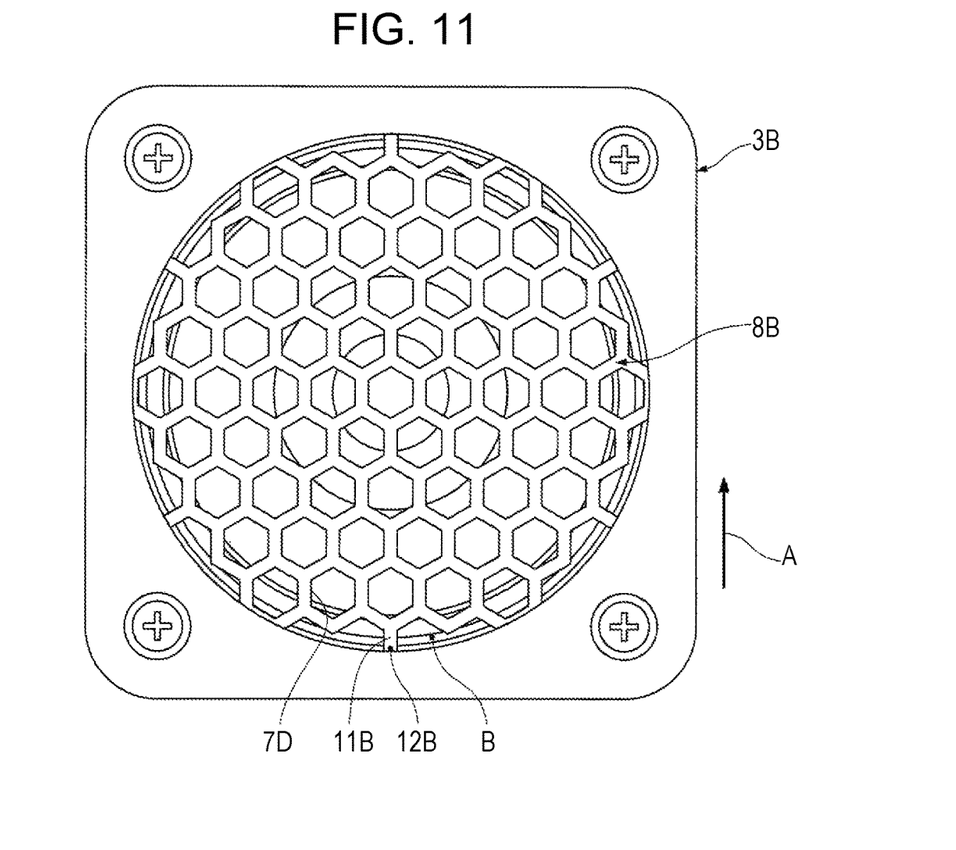
FIG. 11 is a front view of a grille in Comparative Example 2.

FIG. 11 shows grille 8B of lid 3B in Comparative Example 2. Grille 8B is identical to the grille shown in FIG. 6 except for the connection between the annular frames and the inner peripheral surface of the front opening at the bottom end of the front opening of lid 3B. In short, each hole 7D have the same hole area as hole 7. In Comparative Example 2, the annular frames are connected to the inner peripheral surface of the front opening at the bottom end not by sides 11B but by corner 12B. In this case, each hole 7D has smaller area B at the bottom end of the front opening than in Exemplary Example. This makes the drainage performance lower in Comparative Example 2 than in Exemplary Example.

With the above-described structure, according to the present exemplary embodiment, when rain splash from the road surface during driving enters grille 8, hexagonal holes 7 can reduce the surface tension of the rain water and easily drain it.

This prevents water from remaining inside grille 8 for a long period of time, thereby significantly reducing degradation of components, such as diaphragm 30, vulnerable to water.

As described earlier, box 2 shown in FIG. 3 is provided with recess 5 extending along the outer periphery of the back side of loudspeaker 4. O-ring 6 is elastically deformed to seal between box 2 and the outer periphery of the back side of loudspeaker 4, thereby preventing water infiltration into box 2. Meanwhile, water entered grille 8 can be easily drained because the surface tension of the water is reduced by holes 7.

Therefore, loudspeaker box 1 is very useful as a loudspeaker box installed in severe environments, such as a motor or engine compartment, exposed to water.

Loudspeaker device 70 may be installed in other locations than motor compartment 15, such as in the housing of a side-view mirror, in a bumper, and in a trunk.

Loudspeaker 4, which has waterproof properties itself, may be used in applications other than loudspeaker device 70. In that case, it may be installed in locations other than motor compartment 15 or an engine compartment, such as in the housing of a side-view mirror, in a bumper, and in a trunk.

Loudspeaker device 70 and loudspeaker 4 may be used in applications other than vehicle proximity warning devices, such as engine sound generation devices and active noise reduction devices.

Loudspeaker 4 including diaphragm 30 described above can be combined with loudspeaker box 1 to achieve loudspeaker device 70. In this case, each of loudspeaker 4 and box 1 exhibits its waterproof effect, so that the synergistic effect provides extremely high waterproofness. The drainage effect of grille 8, however, remains even if loudspeaker 4 is replaced by a well-known ordinary loudspeaker.

When loudspeaker 4 including diaphragm 30 is combined with loudspeaker box 1, the sound pressure level can also be significantly improved by the synergistic effect.

INDUSTRIAL APPLICABILITY

The loudspeaker device according to the present disclosure is excellent in both sound emission properties and drainage performance. Therefore, the loudspeaker device contributes to the improvement of long-term reliability of various devices used in severe environments exposed to water.

REFERENCE MARKS IN THE DRAWINGS 1 loudspeaker box
2 box 3, 3B lid
4 loudspeaker
5 recess
6 O-ring
7, 7A, 7B, 7C, 7D water-drain hole (hole)
8, 8A, 8B grille
9 front opening
10 annular frame
11, 11B, OS side
12, 12B corner
13 movable-body apparatus
14 motor
15 motor compartment
16 screw
17 main body
18 electronic device
30 diaphragm
31 edge
32 loudspeaker frame
33 magnetic circuit
34 bobbin
35 voice coil
41 rear layer
42 front layer
51 paper-making bath
52 primary paper-making net
53 primary paper liquid
55 secondary paper-making net
56 paper-making table
57 paper-making bath
58 secondary paper liquid
60 mold
61 wire net
62 mold
70 loudspeaker device

The invention claimed is:

1. A loudspeaker device comprising:
   a loudspeaker;
   a box accommodating the loudspeaker, and being provided with an opening; and
   a cover covering the opening of the box, the cover comprising a grille comprising:
     a plurality of hexagonal holes each having an opening area equal to an area of a circle with a diameter in a range from 6.0 mm to 9.0 mm, inclusive; and
     consecutive annular frames partitioning the plurality of hexagonal holes, each of the annular frames having six sides, wherein at least one of the annular frames is connected, at only one of the six sides, to an inner peripheral surface of the opening.

2. The loudspeaker device according to claim 1, wherein the box is provided with a recess extending along an outer periphery of a back side of the loudspeaker, and the loudspeaker device further comprises an O-ring inserted in the recess.

3. The loudspeaker device according to claim 2, wherein the O-ring is elastically deformed to seal between the box and the outer periphery of the back side of the loudspeaker.

4. The loudspeaker device according to claim 1, wherein the loudspeaker comprises:
   a magnetic circuit provided with a magnetic gap;
   a diaphragm comprising:
     a rear layer comprising a beaten cellulose paper material and a water-proofing agent adsorbed to the cellulose paper material; and
     a front layer facing the opening of the box and comprising a cellulose fiber composition;
   a bobbin having:
     a first end coupled with the diaphragm; and
     a second end inserted in the magnetic gap; and
   a voice coil wound around the bobbin.

5. The loudspeaker device according to claim 4, wherein the cellulose paper material of the rear layer comprises, as a main component, either wood or bamboo each with an average fiber diameter of not less than 12.5 µm and less than 13.5 µm.

6. The loudspeaker device according to claim 4, wherein the cellulose fiber composition of the front layer comprises cellulose nanofibers.

7. A movable-body apparatus comprising:
   a movable main body;
   a drive unit mounted to the main body and operable to move the main body;
   a signal processor mounted to the main body; and
   the loudspeaker device according to claim 1 accommodated in the main body, the loudspeaker of the loudspeaker device being electrically connected to the signal processor.

8. The movable-body apparatus according to claim 7, wherein
   the movable-body apparatus comprises an inside and an outside, and
   the loudspeaker device is mounted to the outside.

9. The movable-body apparatus according to claim 8, wherein
   the main body comprises at least one of a motor compartment and an engine compartment accommodating a part of the drive unit, and
   the loudspeaker device is mounted in either the motor compartment or the engine compartment.

10. The loudspeaker device according to claim 1, wherein:
    the loudspeaker includes a diaphragm and,
    the grille is located apart from the diaphragm.

* * * * *